United States Patent [19]

Caroli

[11] 4,344,457
[45] Aug. 17, 1982

[54] TAP AND MIXER FOR THE DELIVERY OF WATER

[76] Inventor: Celso Caroli, Via Sardegna, 16, Savignano sul Panaro (Modena), Italy

[21] Appl. No.: 141,677

[22] Filed: Apr. 18, 1980

[30] Foreign Application Priority Data

Apr. 19, 1980 [IT] Italy .............................. 28948/79[U]
Apr. 19, 1980 [IT] Italy .............................. 28949/79[U]
Apr. 19, 1980 [IT] Italy .............................. 40051 A/79

[51] Int. Cl.³ .......................................... F16K 13/00
[52] U.S. Cl. .................................. 137/597; 137/606; 137/625.28; 251/118; 251/230; 251/323; 251/DIG. 3
[58] Field of Search ................... 137/606, 625.28, 597; 251/118, 230, 251, 253, 258, 259, 263, 321, 322, DIG. 3, 323

[56] References Cited

U.S. PATENT DOCUMENTS

| 1,106,633 | 8/1914 | Denehie | 251/DIG. 3 |
| 2,214,250 | 9/1940 | Landrum | 251/323 X |
| 3,603,349 | 9/1971 | Botnick | 137/606 X |
| 3,896,834 | 7/1975 | Paul | 251/DIG. 3 |

FOREIGN PATENT DOCUMENTS

| 2316453 | 10/1974 | Fed. Rep. of Germany ... 251/DIG. 3 |
| 449261 | 6/1936 | United Kingdom ................ 251/323 |
| 982160 | 2/1965 | United Kingdom ................ 251/321 |
| 1138264 | 12/1968 | United Kingdom ................ 251/322 |

*Primary Examiner*—Robert G. Nilson
*Attorney, Agent, or Firm*—Browdy & Neimark

[57] ABSTRACT

A tap for the delivery of water in sanitary, domestic, public and industrial plants is equipped with one or more than one shutters of truncated-cone or flat spiral shape, controlled by a push-button. The push-button consists of a small strip of elastic metallic material coated with rubber or plastic material. The turn with the smallest diameter of each shutter is fastened to the end of its control shaft. The turn with the widest diameter can be fixed around the housing of the shutter bore or be movable with respect to the same. Each shutter may also be opened only in part to have the tap deliver water at a variable rate of flow or it may be locked in the open position by a locking and release device to have the tap deliver water at a constant rate of flow. To each shutter corresponds a different rate of water flow when completely opened, the rate of flow being indicated with reference marks on the push-button. By combination of two taps having more than one shutter, a hot and cold water mixing tap is obtained.

15 Claims, 27 Drawing Figures

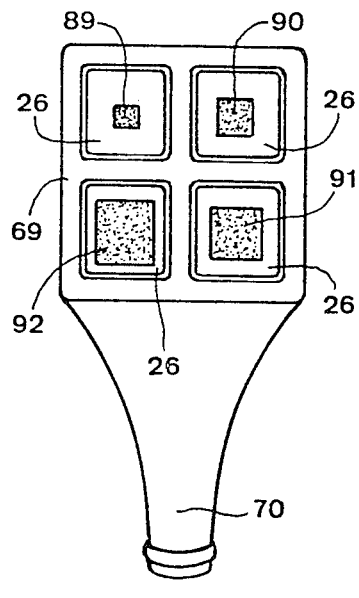
FIG. 18
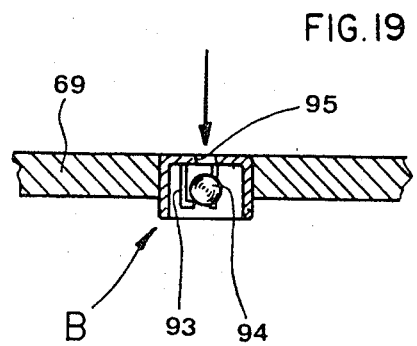
FIG. 19
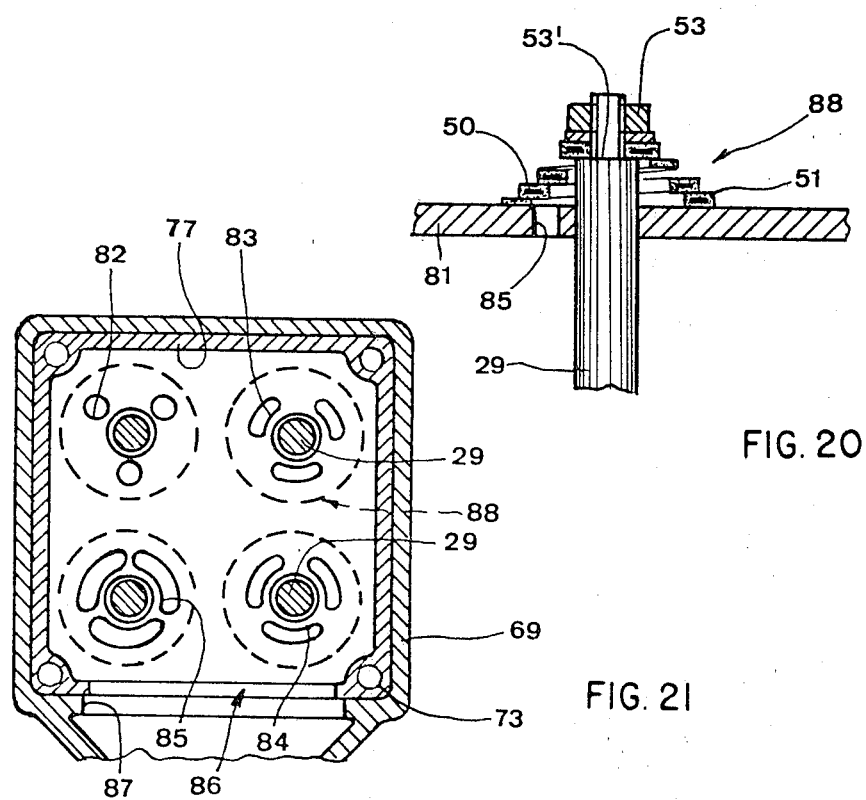
FIG. 20
FIG. 21

TAP AND MIXER FOR THE DELIVERY OF WATER

BACKGROUND OF THE INVENTION

This invention concerns a tap and a mixer for the delivery and mixing of water by using a particular push-button control, that is to say a tap for sanitary, public, domestic or industrial plants, with one or more than one shutter, pushed to open by a push-button against the action of a spring. The invention relates, more particularly, to such an apparatus which includes a mixer consisting of at least two taps (one for hot and one for cold water) with a push-button control, and of a possible deviating element, as well equipped with a push-button control for the delivery of water in two different delivery pipes at choice (tub or shower).

The state of art includes a type of tap with push-button, equipped with a cylindrical shutter with a rubber washer on its surface towards the shutter seat, which is coaxial with the control shaft of the shutter, that is to say with a ring-shaped seal. The shutter is fastened to the end of a shaft, the opposite end of which is formed by the push-button control; in order to draw water it is necessary not only to overcome the action of a spring but, above all, the strong thrust due to the water pressure in the waterworks; such a tap is generally applied only to fountains, as it requires a considerable effort, which can be made only with the palm of the hand or with the thumb of an adult person.

This prior state of art is amenable to further improvements. A cylindrical shutter equipped with the ring-shaped seal must have a considerable diameter according to the rate of flow to be delivered due to the need to have a large annular opening around the shutter shaft, sufficient for the delivery of the large quantity of water generally required; this requires a large base area of the shutter cylinder with the result that a strong thrust is needed, the value of which is determined by the value of the water pressure in the water works, multiplied by the value of the shutter area. For instance, if the shutter has a diameter of 16 mm, its area is approximately 2.5 $cm^2$, which—in the normal case of approximately 30 $N/cm^2$ of pressure in the water works—requires a thrust of 75 N more than that of the spring.

From the aforesaid it is evident that such a tap can be operated only by a person with sufficient strength and certainly not by a sick or old person or by a child; therefore, taps that can be operated by means of a push-button have not been used for any domestic purpose.

From the aforesaid state of the art derives the need to solve the technical problem of finding a shutter than can be operated by means of a push-button by any person, even with rather limited strength, that is to say a shutter moved by means of a push-button, requiring a small thrust for its opening, even inferior to 10 N. Thus, in the case of small rates of flow, this thrust might at the utmost be reduced to the value of just a few Newton or less and thus allow the use of the tap also in domestic sanitary plants, where it must be suitable for continuous use also by old and sick persons or children.

SUMMARY OF THE INVENTION

The present invention solves the above set out technical problem by adopting a shutter with a spiral, which in the closed position, may be of truncated cone or flat shape, the spiral consisting of a spring steel strip coated with rubber or suitable plastic material with quadrangular straight section. The spiral ends with a ring formed by the turn with the smallest diameter, having a reduced area, and locked by a nut and washer against an end shoulder of the push-button control shaft. The closing of the orifice for the passing of the water is obtained by the whole of the spiral, the turns of which—coated with elastic material—overlap partially one with another, thus covering all the area of the orifice of the delivery device with a safety margin. The end of the turn with the largest diameter may be free in the case where a constant rate of water flow is foreseen with automatic stop of the shutter in the open position, or it can be fixed with a screw by a ring-shaped appended portion to the plane containing the seat of the shutter, the latter in the case where the drawing of water is foreseen only during operation of the push-button.

A further object of the present invention is the realization of a multiple tap equipped with more than one shutter controlled by push-buttons and set in such a way as to deliver different preestablished constant rates of water flow, when blocked in the open position by a special device. Thus, it is possible for the user to pre-establish the rate of water flow which the tap shall deliver by operating suitably one or more than one shutter.

The present invention foresees also the adoption of the above-mentioned multiple tap to function as a hot and cold water mixer, with which it is possible to pre-establish the quantity of hot and cold water to be mixed and, consequently, the temperature of the water delivered by the mixer.

BRIEF DESCRIPTION OF THE DRAWINGS

Some embodiments of the invention are illustrated by way of examples in the nine accompanying sheets of drawing, where: concerning the tap with only one shutter, FIG. 18 is a left-hand view according to the direction A of FIG. 17 in order to make evident the differentiated push-button panel for four programs. FIG. 19 is a blown-up section of the detail B of FIG. 17 concerning a draining valve of possible stagnant water. FIG. 20 is a blown-up section of a shutter with truncated-cone spiral of the type described in FIGS. 6, 7, 8 in the position of the beginning of the opening of a tap element. FIG. 21 is the section XXI—XXI of FIG. 17. As to the hot and cold water mixer.

DESCRIPTION OF THE PREFERRED EMBODIMENTS

Figure 1:
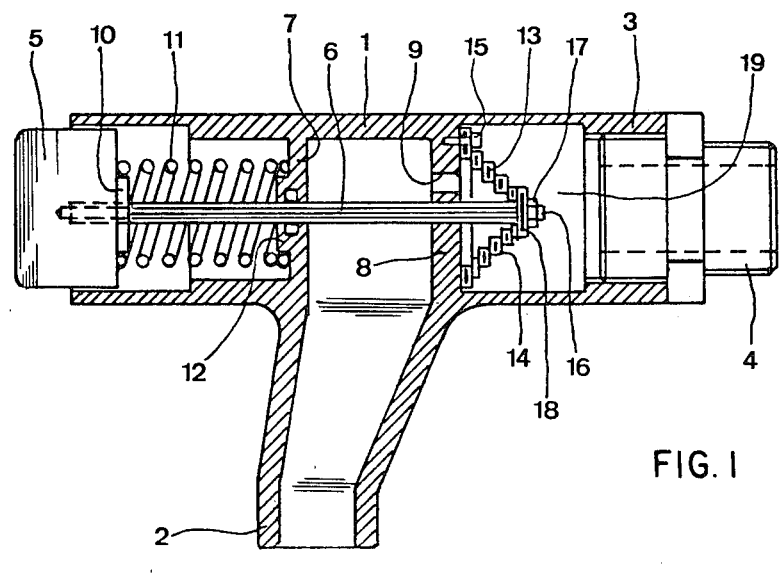
FIG. 1 is a longitudinal section of a tap which remains open only during the action of hand pressure on the push-button, with a rate of flow depending on the degree up to which the shutter is opened.

In the drawings, 1 is the hollow body of the tap of FIG. 1 equipped with a delivery orifice 2 and a threaded tang 3 for the fastening to the fitting 4 for the junction to the water works. A push-button 5 is provided for manual operation of the tap equipped with a shaft 6 sliding axially in a watertight manner in the support diaphragm 7 and in the support diaphragm 8, the latter being equipped with openings 9 for the passing of water. A collar 10 of the push-button 5 for the centering of the spring 11 is provided, the opposite end of which is centered in the collar 12 of the support 7. A flat element 13 of flexible spring steel wound up to form a truncated cone spiral coated with plastic material or with rubber 14 is provided, the end of which with the larger base being fastened to the diaphragm 8 by a screw 15. The threaded end 16 of the shaft 6, has a smaller diameter than that of the shaft itself in order to lock the small end ring 18 of the spiral by the nut 17. A water feed chamber 19 is associated with the water input.

Figure 2:
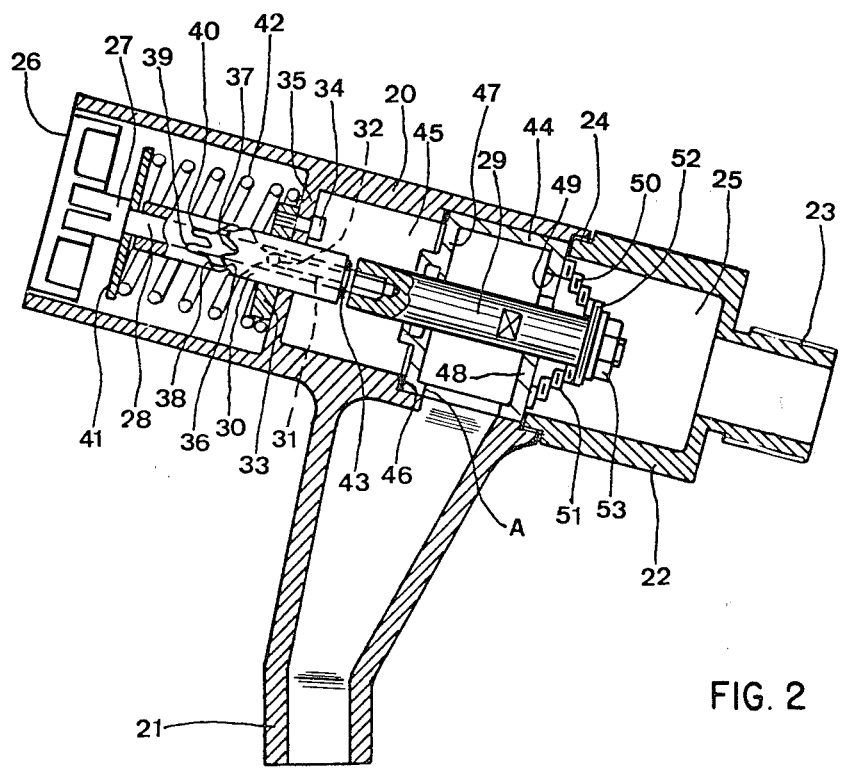
FIG. 2 is a section like that of FIG. 1 concerning a tap which remains open, when operated, to deliver a constant rate of flow.
Figure 3:
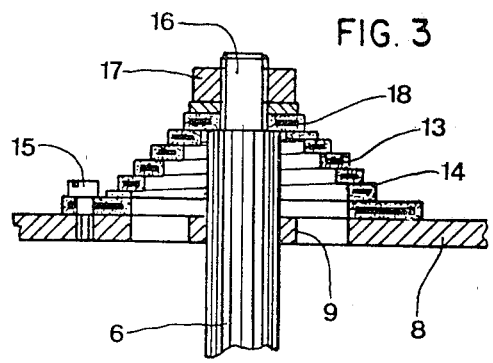
FIGS. 3–5 illustrate details of the constrained shutter of the tap of FIG. 1 in the closed, half open or completely open position, respectively.

In FIG. 2, the hollow body 20 is equipped with delivery opening 21. A union 22 is equipped with a threaded tang 23 for the coupling with the pipes of the waterworks. A threaded coupling 24 of the union 22 to the body 20 is included. A water feed chamber 25 is provided within the union 22. A push-button control 26 is pressure-fixed to the head 27 of the shaft 28, threaded at its end for introduction into the rod 29. An idle sleeve 30 is mounted around the shaft 28 outwardly equipped with a notch shaped as those types substantially known in electric switches in order to obtain two stable axial positions, one open and the other closed, of the shutter 50, 51. The sleeve 30 includes an outward Y-shaped rear groove 31, in which slides the stake 32 radially projecting from the inside of the ring 33 fastened to the support diaphragm 35 by a screw 34. The front profile 36 of the notch is equipped with a V-shaped cove 37 intended to receive in a stable position the stake 32 to keep the tap open. The back profile 38 of the notch of shaft 28 is equipped with loops 39 and 40 centrally separated by an asymmetric element respectively to house the stake 32 at the end of its stroke during the opening phase and to house the stake at the end of its stroke during the initial stage of the closing phase. A washer 41 is inserted on the shaft 28 interposed between the head 27 and the sleeve 30 in order to compress the spring 42 against the diaphragm 35. A retaining ring 43 of the sleeve 30 is on the shaft 28. A box 44 is inserted towards the chamber 45 against the ledge 46. A diaphragm of the box 44 supports in a sliding manner and watertight the shaft 29. Another diaphragm 48 of the box 44 is equipped with holes 49 and supports in a sliding manner the shaft 29. A indicates the opening of the box 44 for the passing of the water coming from the feed chamber 25 through the shutter 50-51 when opened to allow the outflow towards the outlet opening 21. Numerals 50 and 51 indicate a shutter, like elements 13, 14 of FIG. 1, however free in its larger base. The smaller base of the shutter 50, 51 is formed by the ring 52 and locked to the end of the shaft 29 by nut 53.

Figure 11:
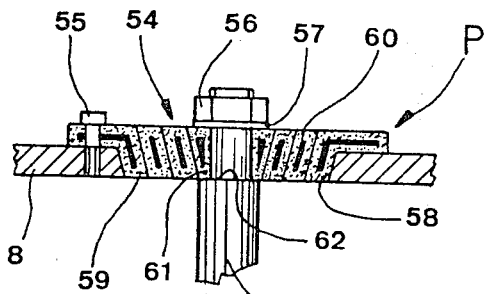
FIGS. 11–13 are sections of a variation of the shutter of FIGS. 3, 4, 5, respectively, in a closed, half open or open position.
Figure 12:
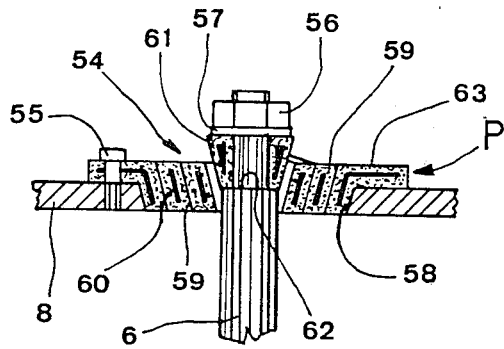
Figure 13:
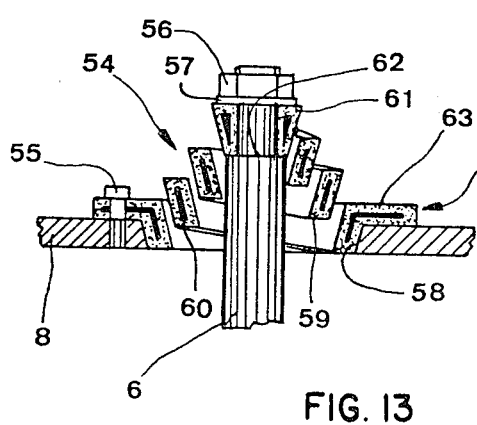

FIGS. 11, 12, 13 show a shutter 54 with a flat spiral with co-axial truncated cone coupling of the turns converging towards the shaft 6. The shutter 54 fastened by the screw 55 to the diaphragm 8 through the end of its larger turn equipped with a peripheral rim P. A nut 56 is screwed on the shaft 6 upwardly threaded. Member 57 is a washer and member 58 is a truncated cone housing defined in the diaphragm 8 to receive the shutter 54. Turns 59 with parrellelogram section are of plastic material or rubber equipped with a core 60 consisting of a flat element of flexible spring steel. Numeral 61 is the initial turn with trapezoidal section resting against the ledge 62 of the shaft 6, and the outer turn 63 is equipped with peripheral rim P for the support and the fastening on the diaphragm 8.

Figure 6:
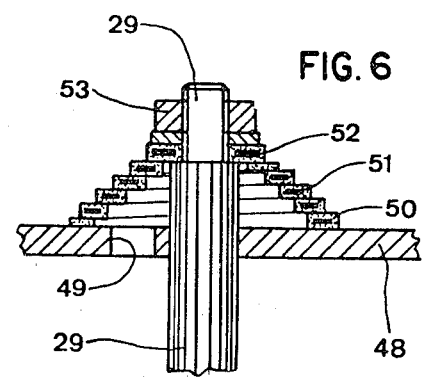
FIGS. 6–8 illustrate analogous details as those in FIGS. 3–5 concerning the tap of FIG. 2 with free shutter.
Figure 4:
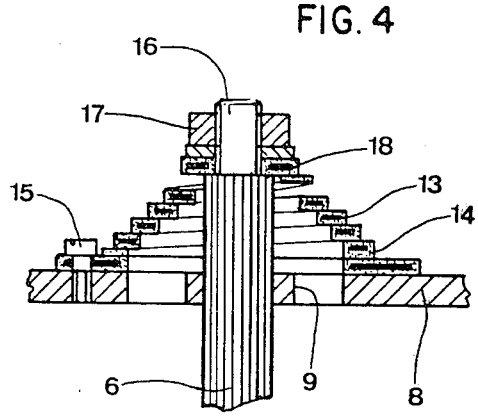
Figure 7:
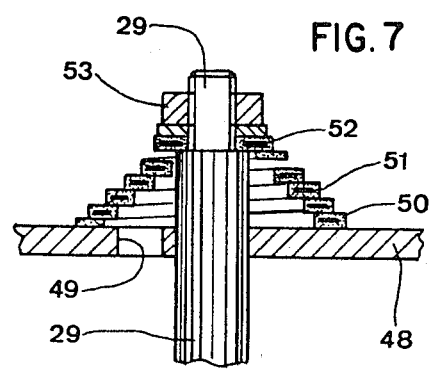
Figure 5:
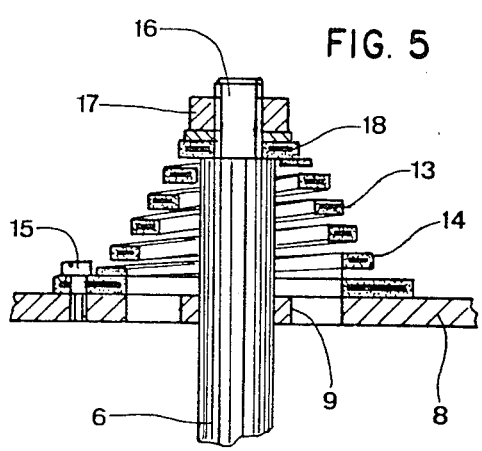
Figure 8:
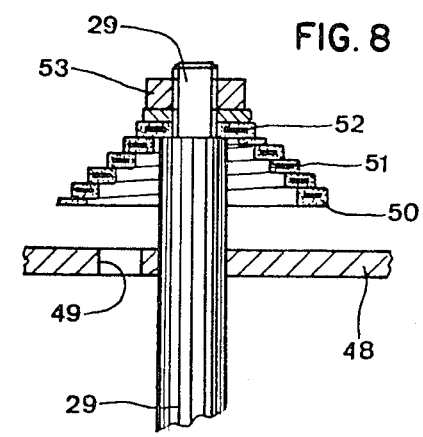
Figure 14:
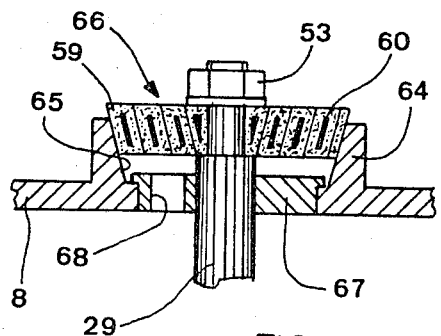
FIGS. 14, 15, 16 are sections of another variation of the shutter without fastening of the base end of the spiral, represented respectively in a closed, half open and open position. With regard to a multiple tap embodiment.
Figure 15:
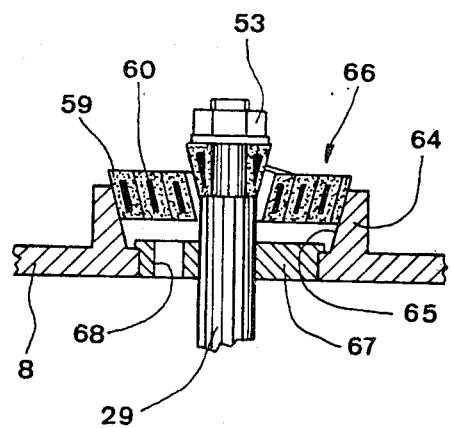
Figure 16:
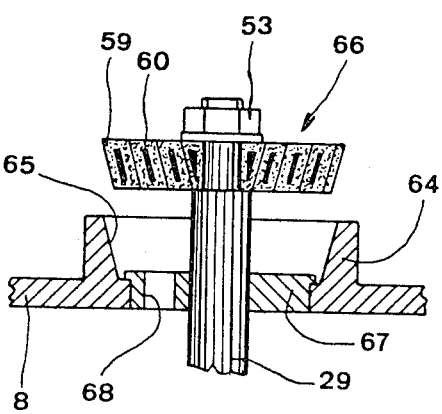
Figure 17:
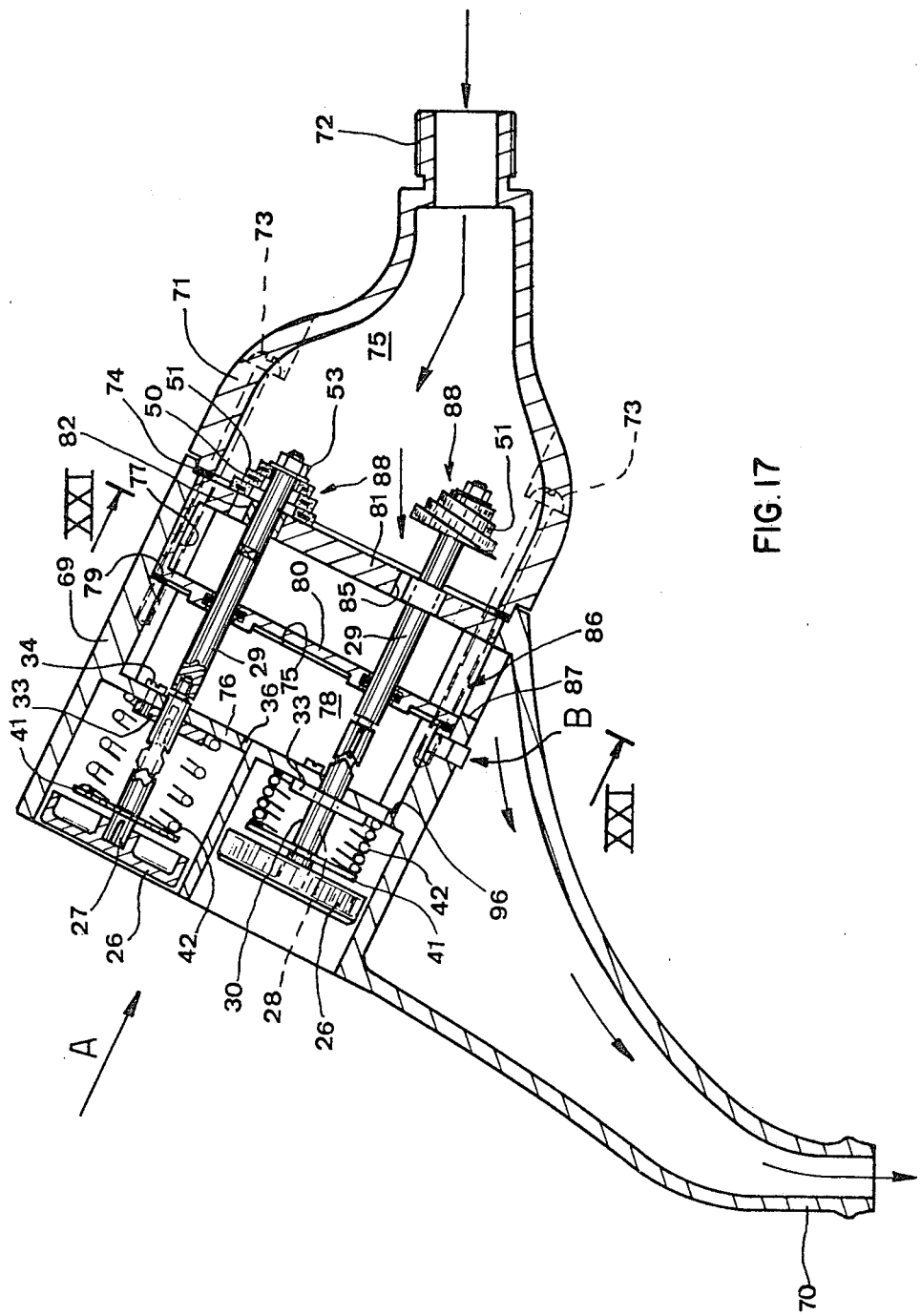
FIG. 17 is a longitudinal section of a multiple tap made corresponding to two push-button delivery elements of the type of FIGS. 9, 10 with different rates of flow.
Figure 22:
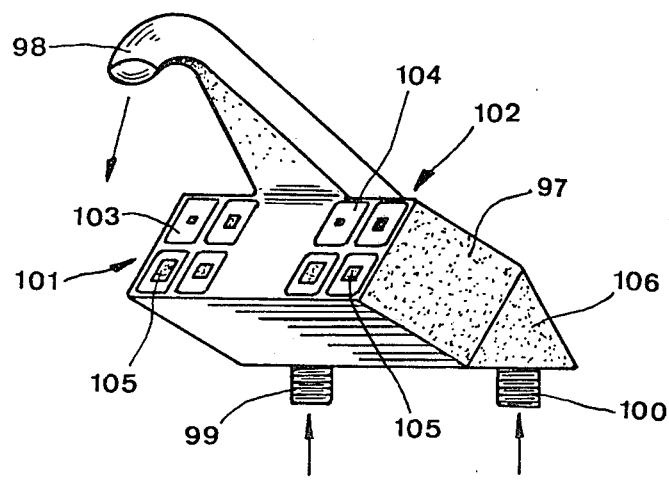
FIG. 22 is a perspective view of a mixer equipped with two quadruple taps of the type shown in FIG. 17, and therefore, with at least sixteen combinations of hot and cold water mixing.
Figure 23:
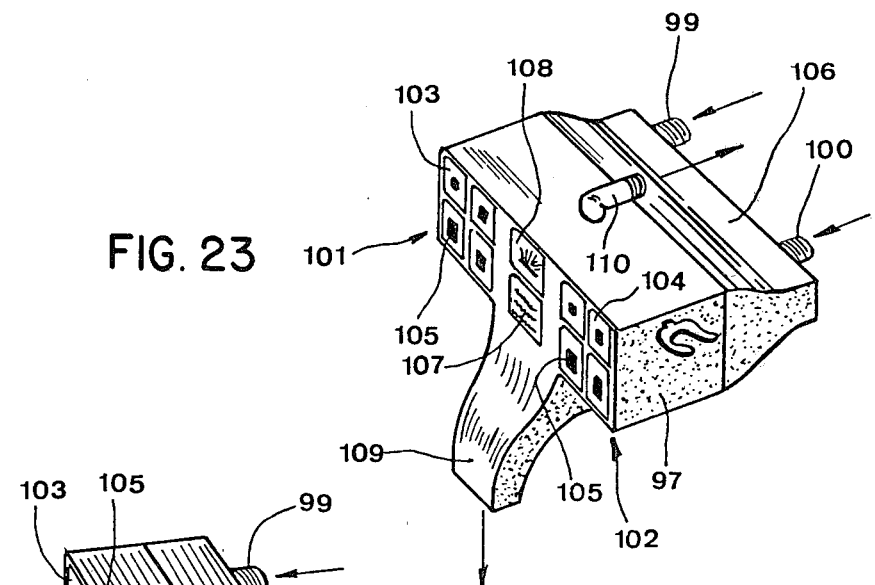
FIG. 23 is a perspective view of a mixer for bath-tubs with a deviating element to feed the shower, with combinations of the type illustrated in FIG. 22.
Figure 24:
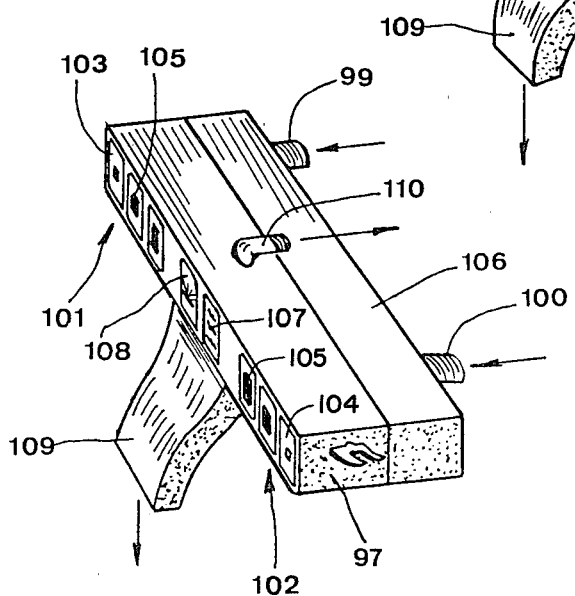
FIG. 24 is a perspective view of a mixer with deviating element with a possibility of at least nine mixing combinations.

As shown in FIGS. 14–16, an annular projecting ridge 64 of the diaphragm 8 is provided in which is made the truncated cone housing 65 of a shutter 66 of the same type as the shutter 54, but not fixed to the diaphragm. An interchangeable ring 67 is inserted in the diaphragm 8 equipped with calibrated openings 68 for the outflow of water at a pre-established rate of flow. Instead of the interchangeable ring 67, the whole of the annular projecting ridge 64 and the ring 67 might be analogously rendered interchangeable on the diaphragm 8. As shown in FIG. 17, body 69 of a multiple tap with polygonal section is equipped with four shutters with truncated cone spiral of the type described with reference to FIGS. 6, 7, 8 with push-button control of the type described in FIGS. 9, 10. The apparatus includes delivery opening 70 of the tap. A bell-type element 71 is equipped with coupling 72 to the piping of the water works, and fastened to the body 69 by screws 73, with an interposed gasket 74 delimiting the water feed chamber 75 from the water works. A support diaphragm 76 of the rings 33 is provided. Numeral 77 indicates a box inserted towards the chamber 78 against the ledge 79. A diaphragm 80 of the box 77 supports in sliding and waterproof manner the four rods 29 corresponding to as many push-buttons 26. Numeral 81 indicates another diaphragm of the box 77, equipped with four series of openings 82, 83, 84, 85 (FIG. 21) of a dimension growing in proportion to the rates of flow, supporting in sliding manner the four rods 29. An opening 86 of the box 77 is provided for the delivery to the opening 70 of the water coming from the feed chamber 75 through the openings 82, 83, 84, 85. A slit 87 of the tap body 69 is positioned in correspondence with the opening 86 of the box 77. Member 88 is a shutter with truncated cone spiral of the type described in FIGS. 6, 7, 8. As illustrated in FIG. 18, marks 89-92 of growing area relief are printed on the push-button controls 26 in order to distinguish the growing rates of flow. As shown in FIG. 19, cage elements 93 are provided to support a ball-type shutter 94 in plastic material intended to close bore hole 95 in the case where a water pressure is created in the delivery opening, for the purpose of avoiding a consequent penetration of water into the chamber 78. Numeral 96 indicates small holes made in the diaphragm 76 for the discharge of the water that might penetrate under the push-buttons 26 because of the inclination of the tap body 69. FIG. 22 illustrates the body 87 of a mixer equipped with two multiple taps of the type described in FIG. 17. A delivery opening 98 of the mixer is provided. Numerals 99 and 100 indicate two threaded tangs of the body 97 for the coupling with feed pipes of hot and respectively cold water. Push-button panels 101, 102 are respectively for the hot and cold water and are equipped with push-buttons 103 and 104 completely analogous to the push-buttons 26 recessed in niches and equipped with marks 105 of growing area and relief printed to allow the recognition by sight and feeling of growing rates of flow. A box 106 housing the water feed chamber is fastened to the body 97 by screws. Numerals 107 and 108 (FIGS. 23 and 24) indicate push-buttons which control the deviation of the flow of mixed water respectively to the lower delivery opening 109 of the mixer and to the upper opening 110 for the coupling of the flexible pipe of the shower.

Figure 25:
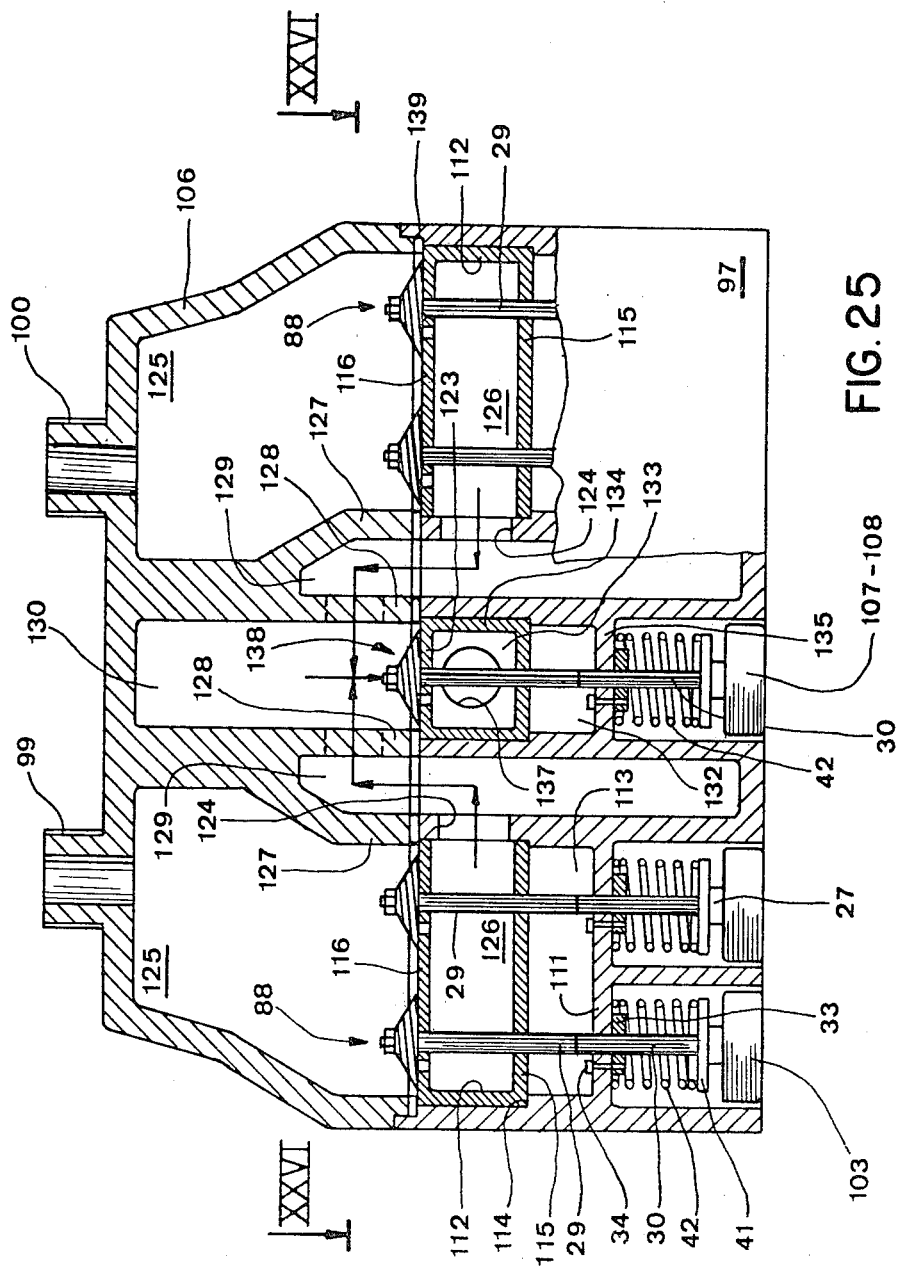
FIG. 25 is a blown-up partial horizontal section of the mixer with deviating element of FIG. 23.
Figure 26:
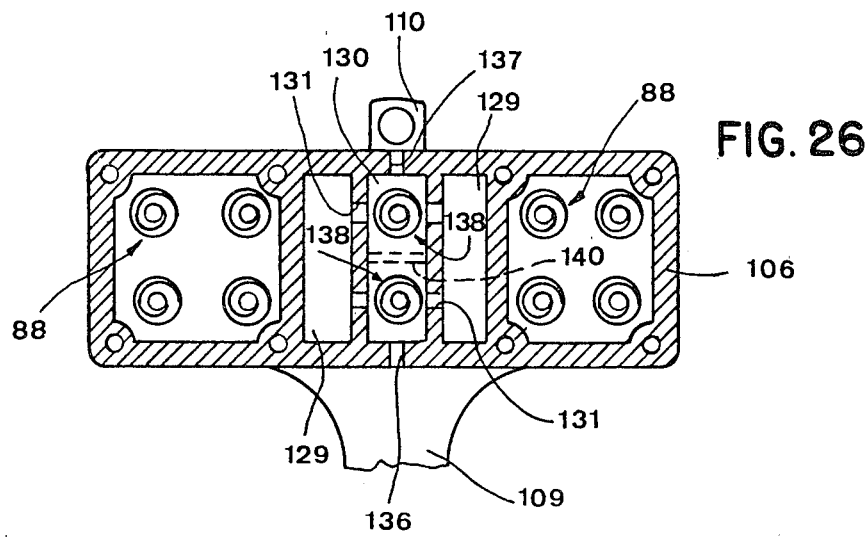
FIG. 26 is the section XXVI—XXVI of FIG. 25.
Figure 27:
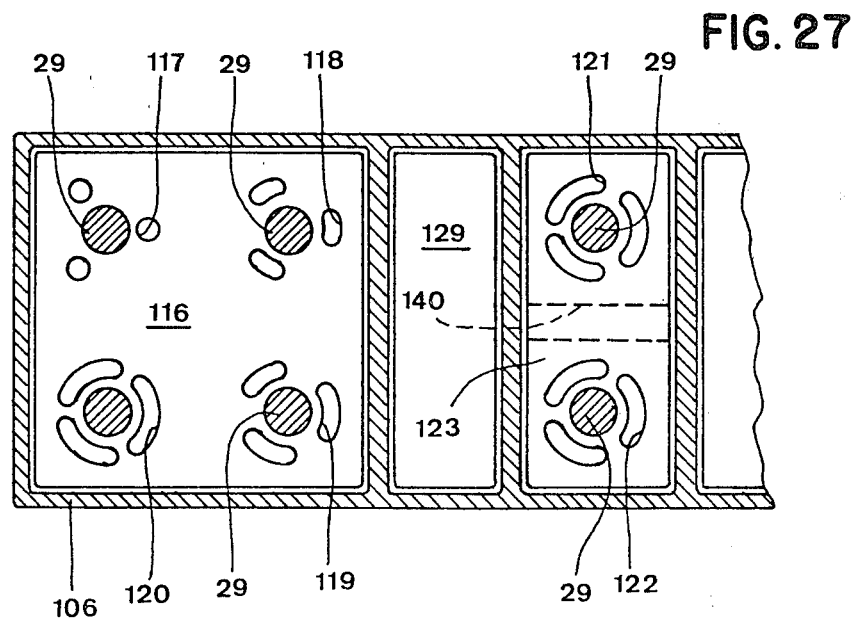
FIG. 27 is a blown-up section of the diaphragm with openings for the gradual outflow of the water.

With respect to FIG. 25, numeral 111 is a support diaphragm of the rings 33, in which the sleeves 30 slide and numeral 112 is a box inserted towards the chamber 113 against the ledge 114. A diaphragm 115 of the box 112, in which the four rods 29 relative to as many push-buttons 103 slide in a waterproof way is included. Numeral 116 is another diaphragm of box 112 supporting in a sliding manner the rods 29 equipped with four series of openings 117, 118, 119, 120 (FIG. 27) of growing dimensions for the hot water as well as for the cold water, and numerals 121, 122 are two series of openings made in the diaphragm 123, respectively to deviate the flow of the mixed water towards the delivery opening 109 and towards the plug 110 for the coupling of the shower pipe. An opening 124 (FIG. 25) of the box 112 is provided to allow the water coming from the chamber 125 to pass through the openings 117, 118, 119, 120 and through the chamber 126. Numerals 127 and 128 are two couples of diaphragms within the body 106 limiting the chambers 129 communicating with the chamber 130 (FIG. 26) by means of the openings 131. Numerals 132 and 133 (FIG. 25) indicated two chambers defined by the box 134 inserted in a housing obtained over the diaphragm 135 of the body 97. Bore holes 136, 137 (FIG. 26) are respectively provided to bring about the communication between the chamber 130 and the delivery opening 109 and the plug 110 for the coupling of the shower pipe. Numeral 138 indicates two shutters with a conical spiral, analogous to the shutters 88 for the opening and the closing of the slits 121, 122. Numeral 139 is a waterproof gasket inserted between the bodies 97 and 106. A diaphragm 140 without opening, divides the chamber 133 into two parts not communicating between one another, but communicating one with the delivery opening 109 and the other with the plug 110 for the coupling with the shower pipe.

In the case of the tap and the shutters described in FIGS. 1, 3, 4, 5 and also FIGS. 11, 12 and 13, the operation is as follows: pressing the pushbutton 5 with a finger against the action of the spring 11, the shaft 6 overcomes the small resistance due to the pressure of the water on the small ring 18 or the smallest turn, in general; the water penetrates gradually between this ring or turn and the following larger turn (FIG. 4) and so on up to the complete opening (FIGS. 5, 13) obtainable with a further limited advancement of the shaft 6 due to a small pressure, such as the initial one, with the result that the rate of flow of the water increases, this being due to the gradual and growing penetration of the water along the surface of spiral coupling of the strip 14 and the strip 59. In the case of the tap and the shutters described in FIGS. 2, 6, 7, 8 and also FIGS. 14, 15 and 16 the opening will still be gradual beginning from the center, but at a certain point the shutter with the truncated cone or flat spiral will disjoin from its seat in order to allow the passing of the water at maximum rate of flow between the base of the shutter and the housing without interposing even the resistance of the passage through the turns to the flow of the water.

Figure 9:
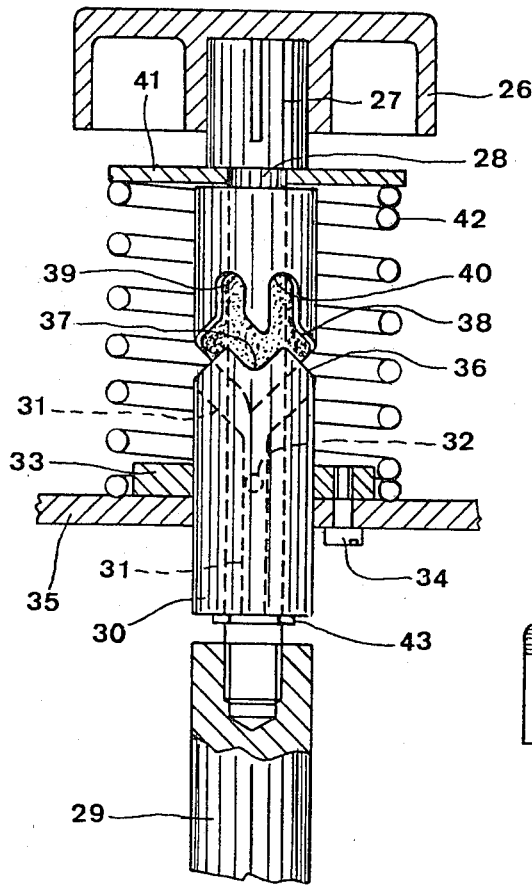
FIG. 9 is an axial section of the control element of the tap of FIG. 2 in a closed position.
Figure 10:
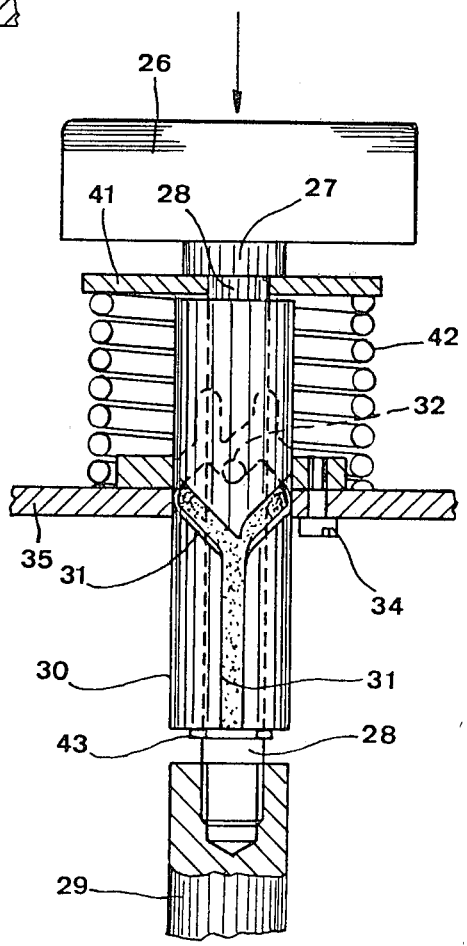
FIG. 10 is a section like that of FIG. 9, however, with the control element in the open position.

If the delivery of the water is required at a constant rate of flow without keeping the finger on the push-button, the shutter is equipped with the connection and disconnection device of FIGS. 9 and 10, which allows the operation of the complete opening of the tap by means of pressure on the push-button 26 up to the end of its stroke and the closing by means of another pressure on the push-button with a finger.

In the case of the multiple tap described in FIGS. 17, 18, 19, 20, 21, the operation takes place in the following way: after pressing completely with a finger one of the push-buttons 26, for instance the push-button 26, 92 (FIG. 18) corresponding to the maximum single rate of flow of the water, the corresponding shutter 88 (FIG. 17) opens gradually with a very little effort and remains open thanks to the connection and disconnection device described in FIGS. 9 and 10 allowing the water to flow from the chamber 75 to the chamber limited by the box 77 through the openings 85 of the diaphragm 81; then the water reaches the delivery opening 70, passing through the opening 86 of the box 77 and the opening 87 of the body 69 of the tap. For the interruption of the water delivery it is sufficient to press the push-button 26, 92 again, disconnecting thus the connection device and closing the shutter 88 against the diaphragm 81. If the user requires any other rate of flow, he can obtain it by pressing the push-button 26 without arriving at the end of its stroke in such a way as to obtain the partial opening of the shutter 88 without intervention of the connection and disconnection device; in this case the shutter closes automatically on release of the push-button. As the shutters 88 are controlled independently one from the other, the use can obtain a rate of flow of the water which represents the sum of two or more deliveries as programmed or possibly of all deliveries available by operating the push-buttons 26 accordingly.

In the case of the mixer of FIGS. 22 to 27, the operation is as follows: the user, who is in front of one push-button panel for the hot and one for the cold water, both divided into push-buttons corresponding in order to growing rates of flow, which are the same for both multiple taps, chooses the total rate of flow of the mixed water he requires; after this—in order to obtain the mixing of the water for instance consisting of equal single rates of flow—he presses the same push-button on both panels corresponding to a rate of flow equal to half of the total quantity required. In the case in which the user wishes a higher temperature degree, keeping the total rate of flow of the mixed water unchanged, he might press the push-button for the next higher rate of flow on the hot water push-button panel and the push-button of the next lower rate of flow on the cold water push button panel. On the other hand, if the user wants to increase the rate of flow of the mixed water, keeping the temperature unchanged, he presses the push-button for the rate of flow immediately superior to the one previously chosen on both push-button panels. In order to deviate the mixed water towards the lower delivery opening 109 or towards the coupling 110 connected to the shower pipe, the user must respectively press the push-buttons 107 and 108.

As each push-button controls a shutter 88 independently from the others, it is possible to obtain a big quantity of combinations, not only of the single push-buttons of one push-button panel with the single push-buttons of the other one, but also combination of two or more push-buttons of one panel with two or more push-buttons of the other panel in order to obtain higher rates of flow.

In the practical realization, the materials, the dimensions, the details and the execution forms of the shutters with the spiral of the tap, the type of connection and disconnection device, the inner and outer shape of the taps and of the mixer, the shape, and the number and the arrangement of the push-buttons for the control of the shutters, can be different from those indicated, but must be technically equivalent to them, without leaving the juridical dominion of the invention. For example, the spirals 13, 14 might present a rectangular section rotated to converge towards its smaller base in such a way as to have a coupling surface of truncated cone shape, sloping towards the outside in order to increase the watertightness between the turns of the shutter; moreover, the mixer might also be consisting simply of two taps like those of FIGS. 1 and 2.

I claim:

1. In a mixing tap for the delivery of water in sanitary plants, of the type having an outflow opening in a wall thereof and operated by at least one push-button and including at least one water-tight shutter, an end of which is fastened to a shaft which slides in aligned bore holes drilled into support diaphragms inside the body of the tap and controlled by application of an adequate pressure on the push-button in order to obtain opening of the shutter against action of a spring, the improvement wherein said shutter consists of a strip of elastic metallic material lined with rubber or plastic material, wound up to form a spiral having a plurality of turns and with continuous partial covering of the width of the strip, that turn of said spiral having the smallest diameter being fastened at its end to said shaft of said shutter, and that turn of said spiral with the largest diameter surrounding completely said water outflow opening and lying freely on the wall surrounding said water outflow opening, without being attached thereto.

2. An improved tap according to claim 1, wherein said shaft of said shutter is equipped with a connection and disconnection device in order to lock said shutter in its position of complete opening.

3. In a mixing tap for the delivery of water in sanitary plants, of the type having an outflow opening in a wall thereof and operated by at least one push-button and including at least one water-tight shutter, an end of which is fastened to a shaft which slides in aligned bore holes drilled into support diaphragms inside the body of the tap and controlled by application of an adequate pressure on the push-button in order to obtain opening of the shutter against action of a spring, the improvement wherein said shutter consists of a strip of elastic metallic material lined with rubber or plastic material, wound up to form a spiral having a plurality of turns and with continuous partial covering of the width of the strip, said spiral forming a flat shutter, wherein the periphery of said water outflow opening is in the form of a truncated cone housing, and wherein that turn of said flat spiral shutter with the largest diameter fits within said housing to seal said water outflow opening when in the closed position.

4. An improved tap according to claim 3, wherein that turn of said flat spiral shutter with the largest diameter has a peripheral ridge resting on a plane of said housing and fastened thereto.

5. An improved tap according to claim 1 or claim 3, in the form of a multiple tap and including at least one additional shutter, said additional shutter shaped and positioned in an orderly fashion in said body of the tap with said one shutter, and at least one additional push-button, each said shutter being operated by a respective one of said push-buttons, and each said push-button having a given flow rate marked thereon.

6. A multiple tap according to claim 5, wherein said body of said tap is divided inwardly into three zones, a front zone containing a push-button panel, inwardly limited by a diaphragm, in which slide in a watertight manner sleeves of respective shutter control shafts; an intermediate chamber through which pass said sleeves and said shutter control shafts sliding in a watertight manner within a diaphragm, which forms a front portion of a box inserted in a watertight manner in a rear portion of said tap body; and a rear chamber communicating with the delivery opening of the tap, limited by said box, the rear wall of which is equipped with bore holes to allow the passing of said shutter shafts surrounded by calibrated openings for passing of water differentiated from one of said shutters at least one other of said shutters.

7. A multiple tap according to claim 6, wherein said box is inserted in a rear portion of said tap body is kept in place by a bell fastened to said body by screws, equipped with an end coupling for connection to a water supply system.

8. A multiple mixing tap according to claim 5, including at least two multiple taps which can be operated independently, assembled in said body, equipped with at least one delivery opening communicating with a rear chamber of each of said taps and means for connecting to a water supply net.

9. A multiple mixing tap according to claim 8, wherein the multiple tap is equipped with two delivery openings operatively arranged to be alternatively or contemporaneously communicating with a deviating element of the water flow, and means in form of push-buttons for operating said two delivery openings.

10. A multiple mixing tap according to claim 8, wherein water flow deviating element comprises: two push-buttons, equipped with reference marks, each operatively arranged for actuating a shaft, equipped with a connection and a disconnection device; two truncated cone or flat spiral shutters, each fastened at the end of one of said shafts; a diaphragm, in which slide in a watertight manner the sleeves of the connection and disconnection device of said shafts and against which lean the counteracting springs of said push-buttons; a box divided inwardly by a diaphragm into two chambers not communicating between each other but each communicating with one of the two delivery openings of the mixer, said box being equipped with bore holes for the passing of the shafts of said shutters surrounded by openings for the passing of the water coming from the two multiple taps.

11. A multiple mixing tap according to claim 8, wherein the tap is inwardly divided into three zones: one pair of side zones forming said body of said at least two multiple taps and one central zone comprising: said water flow deviating element; two chambers placed on the sides of the deviating element, each communicating with the rear chamber of one of the two multiple taps and both communicating with a central chamber, which communicates with the box of the deviating element by means of openings for passing of mixed water.

12. A multiple mixing tap according to claim 8, including box fastened at the rear to said body said box keeping in place boxes arranged in the rear portion of said multiple taps and a box of said deviating element.

13. A multiple mixing tap according to claim 8, including a a box fastened at the rear to said, said box comprising inwardly: a pair of chambers for the feeding of the multiple taps, towards which open the shutters of the taps; an end portion of said chambers being positioned on sides of said deviating element, and the chamber in the center communicating with a box of said deviating element.

14. A tap in accordance with claim 3 wherein said flat spiral shutter lies freely within said housing without being attached thereto.

15. An improved tap according to claim 14, wherein said said shaft for control of its shutter is equipped with a connection and disconnection device in order to lock said shutter in its position of complete opening.

* * * * *